E. E. HICKERSON.
NUT LOCK.
APPLICATION FILED MAR. 1, 1913.
1,075,419.
Patented Oct. 14, 1913.
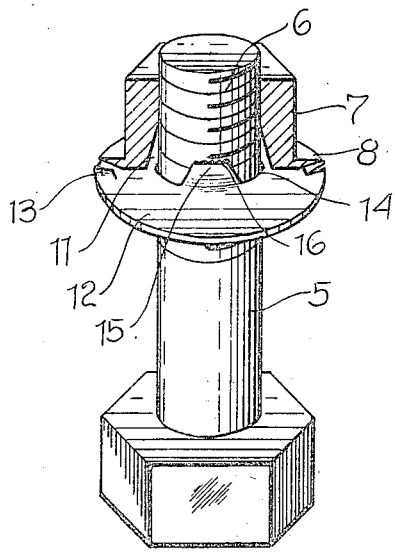
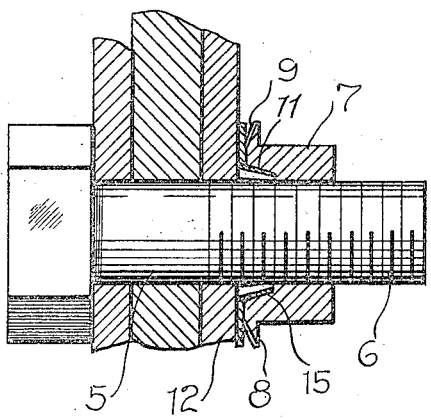
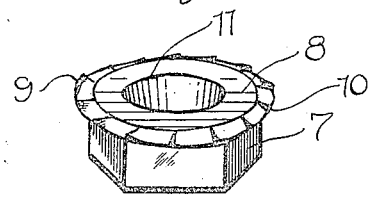
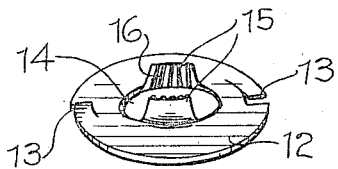
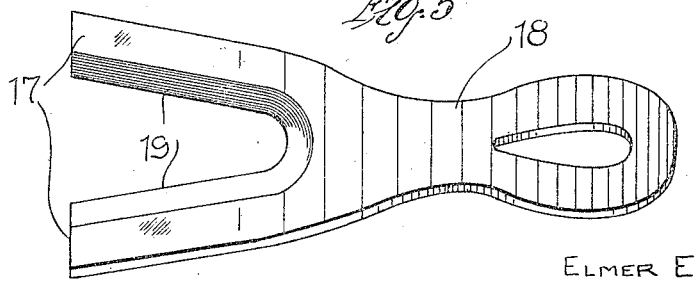
Witnesses
Robert M. Sutphen
A. S. Hind.
Inventor
ELMER E. HICKERSON
By Watson E. Coleman
Attorney

UNITED STATES PATENT OFFICE.

ELMER E. HICKERSON, OF McCOMB, OHIO, ASSIGNOR OF ONE-HALF TO FLOYD ANDERSON, OF McCOMB, OHIO.

NUT-LOCK.

1,075,419.    Specification of Letters Patent.    Patented Oct. 14, 1913.

Application filed March 1, 1913. Serial No. 751,564.

*To all whom it may concern:*

Be it known that I, ELMER E. HICKERSON, citizen of the United States, residing at McComb, in the county of Hancock and State of Ohio, have invented certain new and useful Improvements in Nut-Locks, of which the following is a specification, reference being had to the accompanying drawings.

This invention relates to improvements in nut locks and has for its primary object to provide a simple and effective device of this character whereby the nut may be easily and quickly locked upon the bolt and its accidental displacement prevented.

Another object of the invention is to produce a positive lock for nuts which may be applied to any ordinary bolt, said lock embodying in its preferred form, certain structural features embodied in the nut and in the washer with which said nut coöperates, whereby the threading of the nut into engagement with the washer automatically locks the nut and washer together and simultaneously locks the washer upon the bolt against turning movement.

Another object of the invention is to provide a nut lock which, while securely holding the nut against release from the bolt, may be readily disengaged from the nut for the removal of the latter when desired without mutilating the lock.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is a sectional perspective view, illustrating a nut lock embodying the present invention; Fig. 2 is a longitudinal section; Fig. 3 is a detail perspective view of the nut; Fig. 4 is a similar view of the washer; and Fig. 5 is a perspective view of the tool which is employed to release the locking tongues of the washer from engagement with the nut, when it is desired to remove the nut from the bolt.

Referring in detail to the drawing, 5 designates a bolt which may be of any ordinary or approved form and includes a shank provided with threads indicated at 6.

7 designates a nut which may be of any desired polygonal shape and is provided upon one end with an annular flange 8. One face of this flange is provided with a plurality of beveled facets 9 whereby the shoulders 10 are produced. The nut 7 is of course provided with a threaded bore, and at one end of this bore, the same is gradually enlarged diametrically or flared as shown at 11, such flared end of the bore being smooth or unthreaded.

12 indicates a washer plate which is formed of spring steel. This washer plate at its edge and at diametrically opposite points is split and provided with spring tongues 13 projecting laterally from the same face of the washer but extending in relatively opposite directions. The washer plate has a bolt receiving opening 14 centrally formed therein and upon the edges of this opening at diametrically opposite points, the resilient lugs or extensions 15 are integrally formed. The inner or opposed faces of these extensions are provided with longitudinal teeth 16 the purpose of which will be hereinafter fully pointed out.

In the operation of the device, after the shank of the bolt 5 has been inserted through the objects to be fastened together, the washer plate 12 is arranged upon said bolt and moved inwardly to engage one of its faces with the object, the locking tongues 13 and extensions 15 of the washer projecting outwardly from the other face thereof. The nut 7 is now threaded inwardly upon the shank of the bolt with the shouldered or toothed flange 8 thereof opposed to the washer plate. The beveled facets 9 of the flange on the nut engaging the spring tongues 13 tend to force the same toward the object and into the plane of the body of the washer plate. It is obvious, that the ends of these spring tongues when the nut has been tightened against the face of the washer plate will engage the shoulders 10 upon diametrically opposite sides of the flange of the nut and hold said nut against reverse turning movement. Simultaneously with this locking action of the spring tongues, upon the notched flange of the nut, the wall of the tapering end 11 of the bore of the nut engages the outer faces of the extensions 15 upon opposite sides of the opening 14 of the washer plate and forces the teeth 16 of said extensions into biting engagement with the threads upon the bolt shank, said teeth 16 extending longitudinally of the bolt or across the threads which are provided thereon. It will thus be seen that the washer plate is automatically and securely locked to the bolt so that the nut and the washer cannot thread together off of the bolt shank. This manner of locking the washer upon the bolt eliminates the necessity of providing means upon the washer for engagement by means on the object through which the bolt extends to keep said washer from turning. It will therefore, be appreciated that by means of my improved construction, devices of this character have been greatly simplified and their scope of usefulness extended.

From the foregoing, it is thought that the construction and manner of use of my improved nut lock will be clearly and fully understood.

Owing to the extremely simple construction of the device, it will be obvious that the same can be produced at small manufacturing cost. As the locking action is automatic, the nut may be very easily and quickly locked securely on the bolt. When it is desired to remove the nut from the bolt, a tool of the character shown in Fig. 5 is employed. This tool consists of a metal bar having diverging arms or prongs 17 which are integrally formed upon one end of a suitable handle 18. The inner opposed edges of the arms 17 are beveled as indicated at 19. These arms are adapted to be forced between the washer plate and the face of the nut and the tool then turned so as to move the beveled edges 19 of the arms against the respective spring tongues 13 on opposite sides of the bolt shank and disengage said tongues from the lugs or shoulders 10 upon the nut. The tool is left in this position while the nut is turned upon the bolt and removed therefrom. It will be understood however, that any other desired releasing tool may be employed. It will also be understood that while I have above described the detail structural features of the invention, the same are susceptible of considerable modification within the scope of the appended claim.

Having thus described the invention, what is claimed is:

The combination with a bolt, of a nut having a threaded bore for engagement upon the bolt, said bore being flared at one of its ends, a washer plate having a central opening to receive the bolt shank and spring lugs extending from the edge of said opening at diametrically opposite points and provided upon their opposed faces with teeth extending longitudinally of the bolt shank, said lugs being engaged by the wall of the flared end of the bore in the nut when the nut is threaded into engagement with the washer plate to force the teeth upon said lugs into biting engagement with the threads on the bolt shank, and co-engaging means upon the washer plate and the nut to lock the same together.

In testimony whereof I hereunto affix my signature in the presence of two witnesses.

ELMER E. HICKERSON.

Witnesses:
MABEL TODD,
J. F. BLAKEMAN.